United States Patent [19]
Nakano

[11] Patent Number: 5,333,083
[45] Date of Patent: Jul. 26, 1994

[54] STORAGE APPARATUS HAVING SERVO SYSTEM FOR PERFORMING POSITIONING CONTROL OF HEAD

[75] Inventor: Yasumasa Nakano, Tokyo, Japan

[73] Assignee: Kabushiki Kaisha Toshiba, Kawasaki, Japan

[21] Appl. No.: 56,894

[22] Filed: May 5, 1993

[30] Foreign Application Priority Data

May 6, 1992 [JP] Japan .................. 4-112938

[51] Int. Cl.⁵ .............................. G11B 5/596
[52] U.S. Cl. .................. 360/77.04; 360/78.07
[58] Field of Search ............ 360/77.04, 78.07, 78.09

[56] References Cited

U.S. PATENT DOCUMENTS 4,907,109  3/1990  Senio ................. 360/77.04 X
5,053,897 10/1991  Ikeshita ............. 360/77.04 X

FOREIGN PATENT DOCUMENTS

238318  9/1987  European Pat. Off. ......... 360/77.04

Primary Examiner—Aristotelis M. Psitos
Assistant Examiner—James L. Habermehl
Attorney, Agent, or Firm—Finnegan, Henderson, Farabow, Garrett & Dunner

[57] ABSTRACT

A servo system for use in a magnetic disk apparatus has a memory unit prestoring offset data used to correct offset which can occur when a head is moved to a target track on the disk. The CPU of the servo system uses the offset data stored in the memory unit when the head is moved to the target track at the time of reading and writing data. A settling time period is obtained while the head is moved to the target track on the disk at the time of data reading/writing. The difference between the settling time period is compared with a reference value. If the difference does not fall within an allowable range, the offset data stored in the memory unit is renewed.

6 Claims, 5 Drawing Sheets

STORAGE APPARATUS HAVING SERVO SYSTEM FOR PERFORMING POSITIONING CONTROL OF HEAD

BACKGROUND OF THE INVENTION

1. Field of the Invention

This invention relates to a magnetic disk apparatus equipped with a servo system for positioning the head on a target track of the disk by use of servo data prestored in the disk, and more particularly to a servo system having means for correcting the offset occurring at the time of positioning control.

2. Description of the Related Art

Conventional magnetic disk apparatus such as hard disk apparatuses have a servo system for moving the head to a target track (target cylinder) on the disk, and performing seek operation to position the same at the center of the target track. When the head is positioned on the target track, it performs data-read and -write operation in the data area of the track. In the case of using a plurality of surfaces of a single disk or plural disks, the word "cylinder" may be used in place of the word "track".

The servo system uses servo data prestored in the disk to perform positioning control for head seeking operation. The positioning control mainly consists of speed control performed at the time of moving the head to the target track, and track following control performed at the time of positioning the head at the center of the track. In a sector-servo-type servo system, data is stored in the servo area of each sector of a track, while in a dedicated-servo-type servo system, data is stored in a dedicated servo surface.

The head is supported by a head moving mechanism having an actuator and a voice coil motor (VCM), and is moved by the driving force of the VCM in a radial direction of the disk. The actuator supporting the head transmits a light signal to the head. Further, the actuator has a flexible printed cable (FPC) attached thereto for transmitting a read signal from the head to a read-/write circuit. The FPC has an elastic force which will influence fine movement of the actuator.

The elastic force of the FPC will serves as an offsetting force when the servo system positions the head onto a target track, thereby deviating the head from the target track. This deviation makes longer the "settling time period" required to position the head onto the center of the target track. Accordingly, the seeking time period required is made longer, resulting in a reduction in access speed. Here, the "settling time period" is defined as the time period required to reliably move the head from a track located immediately before the target track, to the center thereof.

When positioning the head to the center of the target track by shifting the control mode from the speed control to the track following control, the servo system generates a position error signal PS based on the servo data to drive the VCM. More specifically, the servo system converts the signal PS to a driving current, to drive the VCM to position the head to the center of the target track.

Figure 6A:
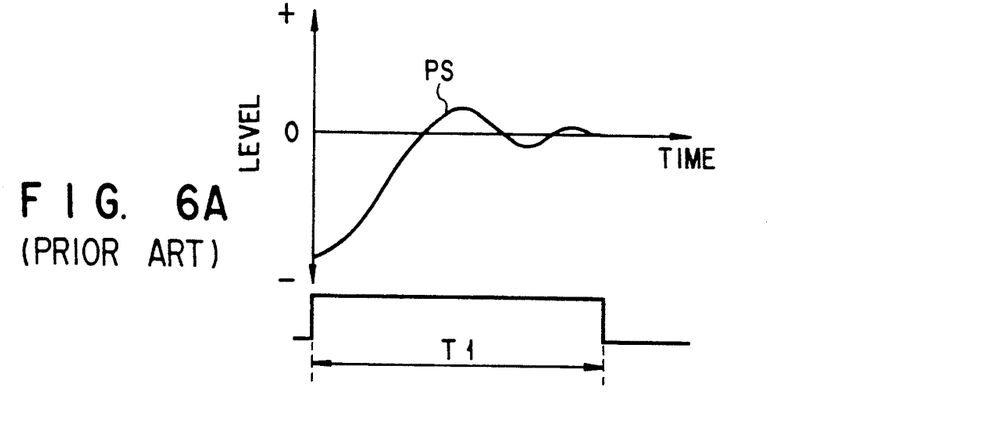
FIGS. 6A–6C are view, useful in explaining the operation of a conventional servo system.
Figure 6B:
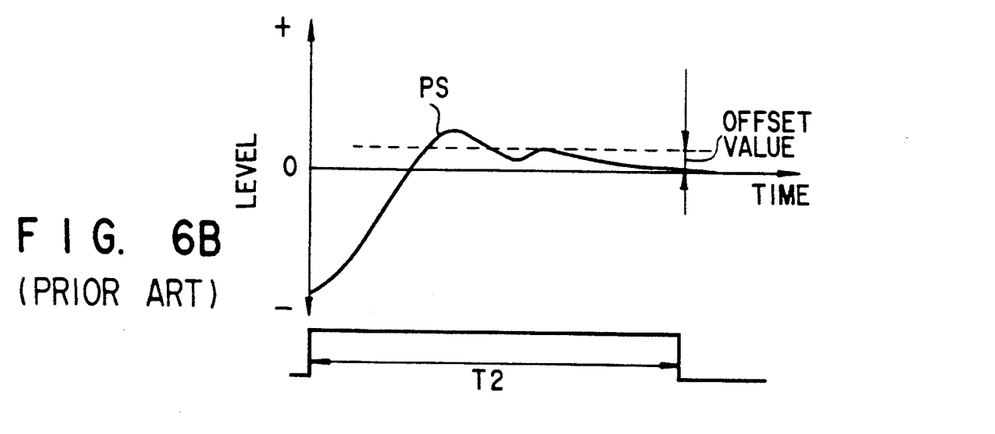
Figure 6C:
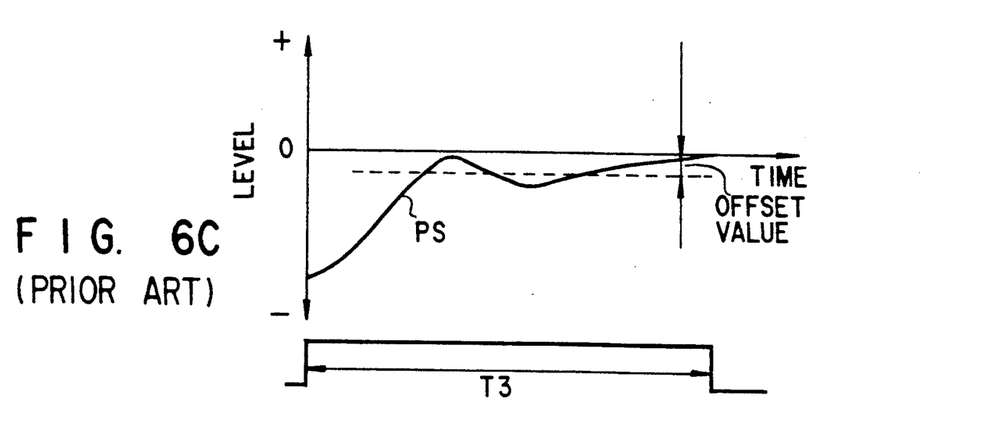

FIGS. 6A–6C show initial response characteristics obtained at the time of the track following control. As is shown in FIG. 6A, a settling time period T1 is a time period required to position the head to the center of the target track, i.e., a time period required to cause the position error signal PS to have a wave level of 0. Supposing that the settling time period T1 is assumed for an offset value of 0, a settling time period T2 longer than the period T1 is assumed when a positive offset value occurs, as is shown in FIG. 6B, whereas a settling time period T3 longer than the period T1 is assumed when a negative offset value occurs, as is shown in FIG. 6C.

In order to correct the offset at the time of head positioning control to thereby shorten the settling time period, a method is developed in which offset data values are prestored in the ROM for correcting the offset, and used at the time of head positioning control. When converting the position error signal to a driving current and supplying the current to the VCM, the servo system adds or subtracts a current corresponding to the offset data value, to or from the driving current. Thus, as is shown in FIGS. 6B and 6C, offset in a positive or negative direction is corrected, thereby shortening the settling time period T2 or T3 to the reference settling time period T1.

Specifically, the ROM stores pre-offset data values as initial data values. Upon turning on the apparatus, the servo system positions the head to predetermined tracks and obtains an offset data value for each track on the basis of the driving current then supplied to the VCM. The offset data values thus obtained are stored in the RAM. If each offset data value stored in the RAM is identical to a corresponding pre-offset data value in the ROM, the pre-offset data value is stored as an optimal offset data value in the RAM. If, on the other hand, they are identical to each other, the offset data value obtained by actual positioning control and stored in the RAM is used as an optimal offset data value. This method is disclosed, for example, in U.S. application Ser. No. 766,778. In order to shorten the settling time period, the servo system generally adjusts the gain of the positioning control system (specifically, the gain of an operational amplifier for outputting the driving current), as well as setting optimal offset data values.

However, even if optimal offset data values are set upon turning on the apparatus, the actual offset value will be varied in accordance with variation in ambient temperature or in the input voltage of the operational amplifier for outputting the driving current. If the offset value exceeds an allowable range, offset cannot be corrected by use of the set offset data value at the time of the head positioning control.

In order to overcome the above, there are provided two conventional methods. In one of the methods, variation in temperature or voltage is monitored by a temperature sensor or a voltage sensor provided in the apparatus, and a new offset data value is obtained by performing the actual positioning control when the variation exceeds an allowable range, thus correcting the previous offset data value. In the other method, an optimal offset data value is set at regular intervals by performing the actual positioning control, without using such a temperature or voltage sensor. The first-mentioned method is disadvantageous in that a particular extra element such as a temperature or voltage sensor is necessary, while the other method is disadvantageous in that read/write access is interrupted at regular intervals, since no read/write access cannot be performed during the time period required to set a new offset data value.

SUMMARY OF THE INVENTION

It is the object of the invention to provide a storage apparatus equipped with a servo system capable of setting an optimal offset data value at a desired time point without using any particular component such as a temperature sensor or a voltage sensor.

To attain the object, the storage apparatus of the invention comprises: memory means storing offset data to be used to correct offset occurring when the head is moved to a target track on a disk by use of the servo system; timer means for detecting a settling time period required to move the head to the center of the target track at the time of performing head positioning by the servo system; determination means for determining whether or not the settling time period detected by the timer means is appropriate; and correction means for correcting the offset data stored in the memory means when the determination means determines that the settling time period is inappropriate.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Figure 1:
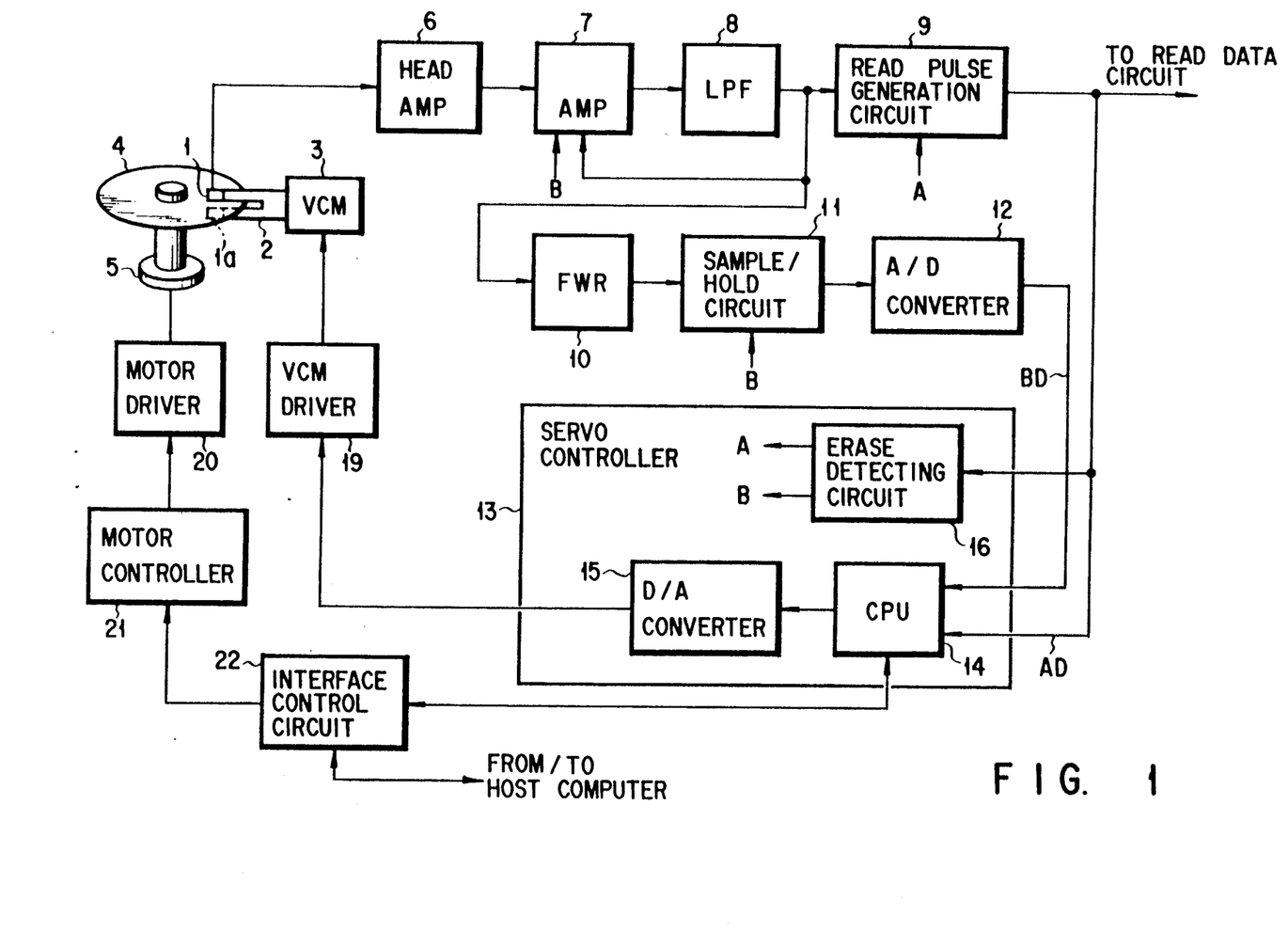
FIG. 1 is a block diagram, showing a servo system according to a first embodiment of the invention.

FIG. 1 shows a servo system for use in a hard disk apparatus according to a first embodiment of the invention. This servo system is a sector servo type in which servo data stored in each sector of a track of a disk 4 is used.

The hard disk apparatus comprises a head 1 (1a) for performing read/write of data from and into the tracks (cylinders) of the disk 4, an actuator 2 for supporting and moving the head 1, and a VCM (voice coil motor) 3 for driving the actuator 2. The disk 4 is rotated by a spindle motor 5. The actuator 2 has a FPC (flexible printed cable) for transmitting a read/write signal between the head 1 and a read/write circuit. The read/write circuit comprises a read signal processing circuit having a head amplifier 6, etc., a read/data circuit, which are hereinafter referred to, and a write circuit (not shown).

The read signal processing circuit comprises the head amplifier 6, an amplifier 7, a low-pass filter (LPF) filter 8, a read pulse generation circuit 9, a full wave rectification (FWR) circuit 10, a sample/hold circuit 11, and an A/D (analog/digital) converter 12.

The head amplifier 6 amplifies a read signal from the head 1. The amplifier 7 outputs the amplified read signal to an LPF 8. The amplifier 7 has a fixed-gain amplifier for amplifying an input signal at a fixed gain, and an AGC amplifier having an automatic gain control function, and being responsive to the output signal of the LPF 8 for controlling the gain thereof so as to make constant the output signal thereof. These two amplifiers are switched over from one to the other by a timing signal B input. An IC (MC1490P) produced by Motorola Inc. is an example of the amplifier 7. The LPF 8 eliminates that frequency component (noise) of a read signal output from the amplifier 7 which is other than a low frequency component.

When the amplifier 7 receives no timing signal B, the fixed-gain amplifier is operated. At this time, the read pulse generation circuit 9 detects the peak of a read signal output from the LPF 8, and generates a read pulse corresponding to the position of each peak. The read pulse mainly consists of servo data and data (user data) to be read/written by a host computer. This user data is transmitted to a read data circuit, where it is reproduced. The servo data is input to a servo controller 13. The controller 13 receives data contained in the servo data and necessary to perform speed control, i.e., track address data (address code) AD.

On the other hand, when the amplifier 7 receives the timing signal B, the AGC amplifier is operated. At this time, the read signal output from the LPF 8 is input via the FWR circuit 10 to the sample/hold circuit 11. The sample/hold circuit 11 performs sample/hold of the amplitude of the read signal, thereby extracting from the servo data burst data necessary to perform the track following control. The A/D converter 12 converts to digital data burst data output from the sample/hold circuit 11, and outputs the digital data to the servo controller 13.

The servo controller 13 is an essential structural element of the servo system, and controls a VCM driver 19 to position the head 1, on the basis of the track address data AD from the read pulse generation circuit 9 and the burst data BD from the A/D converter 12. The VCM driver 19 outputs a driving current to drive the VCM 3. The servo controller 13 has a micro processor (CPU) 14, a D/A (digital/analog) converter 15, and a erase detecting circuit 16, which are used to perform positioning control processing. The D/A converter 15 converts a positioning control signal output from the CPU 14, to an analog voltage signal, and outputs the voltage signal to the VCM driver 19. The positioning control signal consists of a speed control signal used at the time of speed control, and a position error signal used at the time of track following control.

Figure 3:
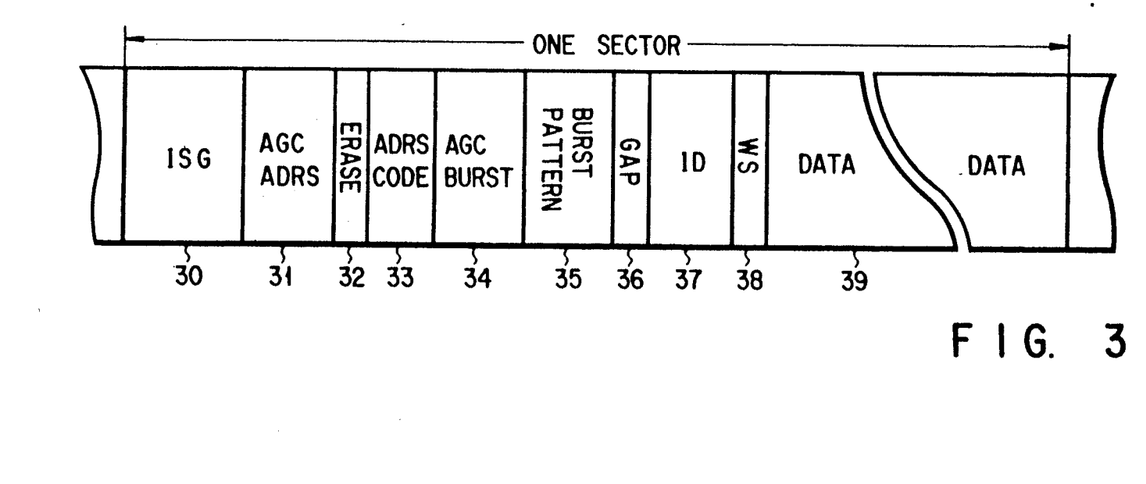
FIG. 3 is a view, useful in explaining a disk employed in the first embodiment.

The erase detecting circuit 16 detects an erase portion from a read pulse string output by the read pulse generation circuit 9, and generates a timing signal A necessary to extract the track address data AD and the timing signal B necessary to extract the burst data. As is shown in FIG. 3, each track on the disk 4 has sectors with a predetermined data format. Each sector has an intersector gap (ISG) 30, an AGC address area (AGC ADRS) 31, an erase area (ERASE) 32, a track address area (ADRS CODE) 33, an AGC burst area (AGC BURST)

34, a burst data area (BURST PATTERN) 35, a gap (GAP) 36, an identification data area (ID) 37, a write splice area (WS) 38, and a user data area (DATA) 39. The ISC 30 serves as a margin for allowing displacement of the start position of each sector due to variation in the rotation of the spindle motor 5. The AGC ADRS 31 is an area storing data necessary to adjust the gain of the amplifier 7 so as to access the ADRS CODE 33. The ERASE 32 is an area storing data necessary to generate the timing signals used to extract the track address (AD) 33 and burst data (BD) 35 contained in servo data. This area 32 has its magnetization not inverted. The AGC BURST 34 is an area for adjusting the gain of the amplifier 7 so as to access the BUST PATTERN 35. The GAP 36 and WS 38 are areas for writing data into the DATA 39 thereby to allow variation in timing. The ID 37 is an area for storing format information of the track (cylinder) and sector.

Figure 2:
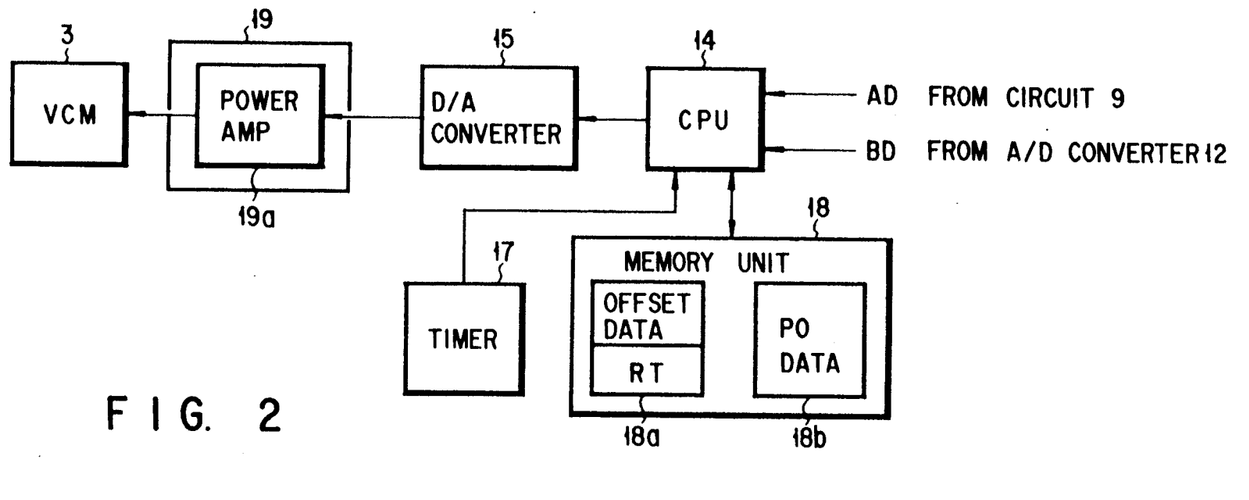
FIG. 2 is a block diagram, showing elements employed in the servo system of the first embodiment.

As is shown in FIG. 2, the servo controller 13 has a timer 17 and a memory unit 18, which are controlled by the CPU 14. The timer 17 detects the settling time period, hereinafter referred to. The memory unit 18 has a RAM (random access memory) 18a and a ROM (read-only memory) 18b. The RAM 18a stores reference settling time data values RT and offset data values used when the CPU 14 performs track following control. The ROM 18b stores preset reference offset data values PO. The VCM driver 19 has a power amplifier 19a for converting an analog voltage signal output from the D/A converter 15, to a driving voltage, as is shown in FIG. 2.

The spindle motor 5 is rotated by a driving current supplied from a motor driver 20, as is shown in FIG. 1. A motor controller 21 is responsive to a motor control signal from an interface control circuit 22, for controlling the motor driver 20 to drive the spindle motor 5. The interface control circuit 22 is connected to the host computer for exchanging read/write data signals or various interface signals.

Then, the operation of the first embodiment will be explained.

First, upon turning on the apparatus, the servo controller 13 drives the VCM 3 to move the head 1 to predetermined target tracks, and measures the degree of offset during positioning the head to the center of each track, as in the conventional case. Specifically, the CPU 14 of the servo controller 13 performs speed control on the basis of the track address data AD output from the read pulse generation circuit 9, thereby moving the head 1 to a target track. In other words, the movement speed of the head 1 is obtained on the basis of that distance between two tracks which is calculated from the track addresses AD of the two tracks read during movement of the head 1, and also on the basis of the time period required to read out the other track address AD after the first-read track address AD. The difference between the calculated movement speed and a target speed is obtained, and the movement speed of the head 1 is increased on the basis of the difference. Since this speed control is performed in a conventional manner, its detailed explanation is omitted. Thereafter, the CPU 14 performs the track following control on the basis of the burst data BD output from the A/D converter 12, thereby positioning the head 1 onto the center of the target track. In other words, two kinds of burst data items BD are stored in those portions of the target track which are located right and left with respect to the center. These data items BD are read, and the difference in amplitude between the items is detected, which indicates the amount of deviation of the head 1 from the center of the target track. The head 1 is moved so as to make zero the deviation amount, thus positioning the head 1 to the center. At this time, as is described above, an offset data value corresponding to each track is measured based on a driving current (position error signal) supplied to the VCM 3, and is then stored in the RAM 18a (FIG. 2). In the ROM 18b, an estimated reference offset data value PO for each track is preset.

The CPU 14 compares the measured offset data value of each track stored in the RAM 18a, with the reference offset data value PO for the track stored in the ROM 18b. If the measured and reference offset data values are identical to each other, the CPU 14 stores the reference offset data value PO in the RAM 18a to use the same as the actual offset data value, whereas if they are not identical to each other, the CPU 14 uses the offset data value stored in the RAM 18a as the actual offset data value. The RAM 18a does not store the off-set data values of all the tracks on the disk 4, and hence the offset data values of tracks, which are not measured, are estimated by use of interpolation, etc. The above-described offset measurement method is explained in more detail in U.S. application Ser. No. 766,778.

Figure 4:
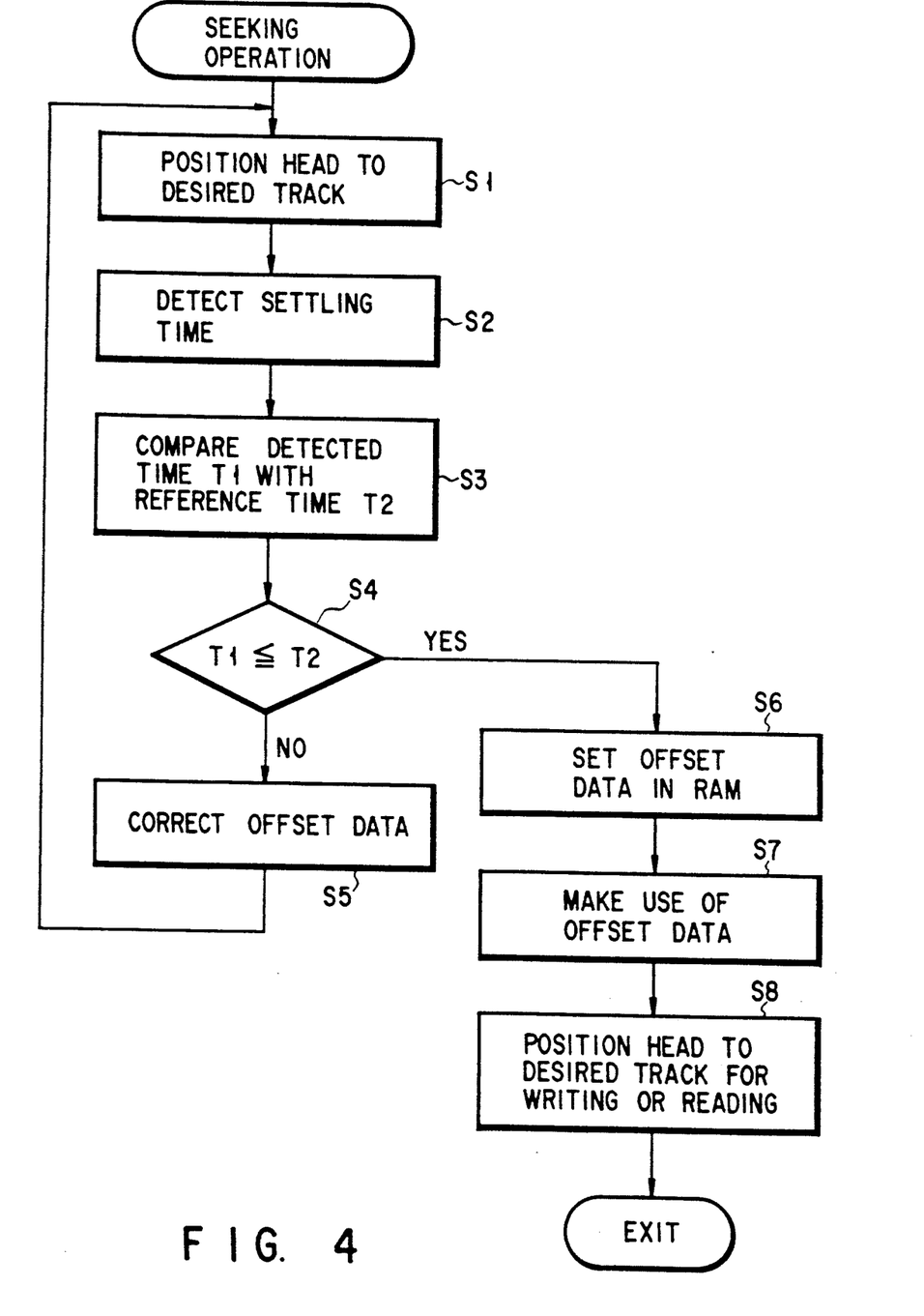
FIG. 4 is a flowchart, useful in explaining the operation of the first embodiment.

Subsequently, when read/write access is performed by the host computer, the CPU 14 of the servo controller 13 performs the track following control for head seeking operation according to the invention, as is shown in FIG. 4. Specifically, the CPU 14 performs speed control based on the track address data AD output from the read pulse generation circuit 9, thereby moving the head 1 to a target track (step S1). At this time, the circuit 9 generates a read pulse based on a read signal supplied from the head 1, as is described above. In response to a timing signal A from the erase detecting circuit 16, the CPU 14 extracts the track address data AD (33) from a read pulse output from the read pulse generation circuit 9, as is shown in FIG. 3.

When the head 1 is moved to the target track, the CPU 14 shifts the control mode from the speed control to the track following control, thereby positioning the head 1 to the center of the target track. At this time, the CPU 14 detects the settling time period required to position the head 1 to the center of the track (step S2). As is aforementioned, the settling time period means a time period required to reliably move the head 1 from a track located immediately before a target track, to the center thereof. The CPU 14 detects the settling time period by use of the timer 17.

The CPU 14 compares the detected settling time T1 with a reference settling time period T2 stored in the RAM 18a (step S3). The reference settling time period 2 is a theoretical value obtained based on a reference seeking time period, and is prestored in the RAM 18a. Alternatively, the reference settling time period 2 may be obtained by, as described above, measuring the settling time period immediately after measuring the offset value, and storing in the RAM 18a the measured settling time period as the reference settling time period T2. Since the period T2 is obtained immediately after measurement of the offset data value, the possibility that the period T2 is accurate is high.

If it is determined in a step S4 that the detected settling time period T1 is shorter than the reference settling time period T2, i.e., if the answer to the question of the step S4 is YES, the CPU 14 sets the off-set data value stored in the RAM 18a, as the actual off-set data value (step S6). The CPU 14 then uses the offset data value stored in the RAM 18a to correct off-set occurring when the head 1 is positioned to the target track (step S7). Specifically, to perform the speed control so as to move the head 1 to the target track, the CPU 14 reads an offset data value from the RAM 18a, and supplies the D/A converter 15 with a speed control signal containing a component corresponding to the read offset data value. The VCM driver 19 converts an analog voltage signal output from the D/A converter 15, to a driving current, and supplies the VCM 3 with the driving current which contains a component corresponding to the offset data value. Then, to perform the track following control so as to move the head 1 to the center of the target track, the CPU 14 reads an offset data value from the RAM 18a, and supplies the D/A converter 15 with a position error signal containing a component corresponding to the offset data value. The VCM driver 19 converts an analog voltage signal output from the D/A converter 15, to a driving current, and supplies the VCM 3 with the driving current which contains a component corresponding to the offset data value. Thus, the offset is corrected, and the head 1 is positioned to the center of the target track in the setting time period T1 (this can be done when the offset value is 0 as shown in FIG. 6A) (step S8).

On the other hand, if it is determined in a step S4 that the detected settling time period T1 exceeds the reference settling time period T2, i.e., if the answer to the question of the step S4 is NO, the CPU 14 corrects the offset data value stored in the RAM 18a, by repeating the measurement of offset performed after turn-on of the system, as is described above (step S5). The CPU 14 sets in the RAM 18a the offset data value newly measured, and moves the head 1 to the target track by use of the newly set offset data value (steps S6-S8).

Figure 5:
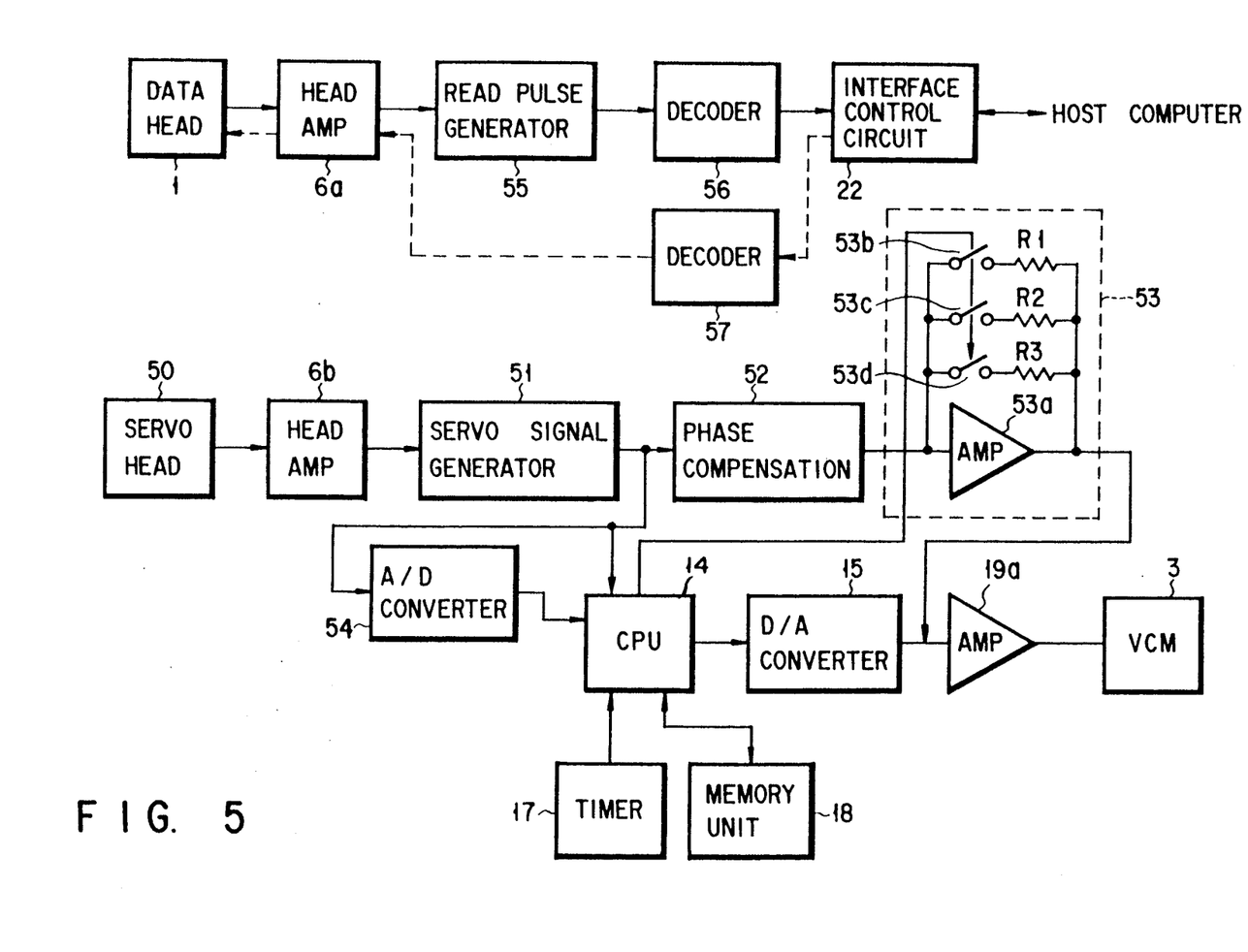
FIG. 5 is a block diagram, showing a servo system according to a second embodiment of the invention.

FIG. 5 shows a servo system according to a second embodiment of the invention. This servo system is of a dedicated servo type in which one surface of the disk 4 is used as a servo surface storing only servo data.

In the dedicated servo-type system, servo data is stored on the overall surface of at least one disk 4, and this surface is used as servo surface. A servo head 50 dedicated to reading the servo data is provided opposed to the servo surface. This system also has a head amplifier 6b, a servo signal generator 51, a phase compensation circuit 52, and a gain correction circuit 53. The servo controller has the CPU 14, D/A converter 15, timer 17, and memory unit 18 as in the first embodiment.

The head amplifier 6b amplifies a read signal supplied from the servo head 50. The servo signal generator 51 receives a servo signal (i.e., an output signal) from the head amplifier 6b, and generates position signals indicative of the position of the servo head 50 and data head 1, and a speed signal indicative of the speed of the servo head 50 and data head 1 and which is obtained by differentiating the position signal. Further, on the basis of the position signal, the generator 51 generates a cylinder pulse each time the servo head 50 and data head 1 cross a cylinder (track). That is, the cylinder pulse is generated when the servo head 50 and data head 1 cross a cylinder at a zero cross point at which the position signal has a potential of 0. Moreover, the servo signal generator 51 generates, during the speed control, a signal (hereinafter called "error speed signal") indicative of the difference between the speed signal and a target speed signal corresponding to the remaining distance from the target track over which the servo head 50 and data head 1 are moved, and outputs the signal to the phase compensation circuit 52. In addition, the generator 51 supplies the compensation circuit 52 and A/D converter 54 with the position signal generated during the track following control. The compensation circuit 52 compensates the phase distortion of a signal output from the servo signal generator 51. The generator 51 also calculates the remaining distance by counting cylinder pulses during the speed control, and outputs the cylinder pulses to the CPU 14. The gain correction circuit 53 has a gain-variable amplifier 53a for correcting the gain of the servo controller. The circuit 53 also has a plurality of gain adjusting resistors R1-R3, and a plurality of switches 53b-53d for switching the resistors R1-R3 from one to another in response to a gain correction signal supplied from the CPU 14.

The data head 1 is provided for reading and writing data from and into the data surface of the disk 4, and is connected to the read/write circuit. The data head 1 is attached to an actuator (not shown), together with the servo head 50. The read/write circuit comprises a head amplifier 6a for amplifying a read signal output from the data head 1, a read pulse generator 55, and a decoder 56. The read pulse generator 55 generates a read pulse corresponding to a read signal output from the head amplifier 6a and indicating read data. The decoder 56 decodes the read pulse output from the read pulse generator 55 to reproduce the read data, and supplies the read data to the host computer via the interface control circuit 22. An encoder 57 encodes, in a predetermined recording manner, write data supplied from the host computer via the interface control circuit 22. The head amplifier 6a supplies the data head 1 with a writing current corresponding to the encoded write data.

Then, the operation of the second embodiment will be explained.

First, as in the case of the first embodiment, the CPU 14 of the servo controller drives, upon turn-on of the system, the VCM 3 to move the head 50 to predetermined target tracks, and measures the degree of offset of the head at the time of the track following control. At this time, in the dedicated-type servo system, the error speed signal output from the servo signal generator 51 is supplied to the power amplifier 19a via the phase compensation circuit 52 and gain correction circuit 53. The power amplifier 19a generates a driving current on the basis of the supplied error speed signal, and outputs it to the VCM 3, which in turn moves the actuator of the data head 1 and servo head 50. The CPU 14 thus performs the speed control, thereby moving the head 50 to the target track.

When the data head 1 and servo head 50 are moved to the target track, the speed control is shifted to the track following control, thereby positioning them to the center of the target track. This is done by supplying a driving current to the VCM3 so as to cause the position signal to have a potential of 0. At this time, the CPU 14 calculates offset data for each track from the position signal supplied to the A/D converter 54, and stores it in the RAM 18a of the memory unit 18 (see FIG. 2). In the ROM 18b of the unit 18, a reference offset data value P0 estimated for each track is prestored. In the second embodiment, in addition to setting of offset data values, the CPU 14 switches the switches 53b-53d from one to another so as to set an optimal gain value for the gain correction circuit 53. The optimal gain value is calculated on the basis of a servo signal from the servo signal generator 51 by use of a known method.

The CPU 14 compares the measured offset data value of each track stored in the RAM 18a, with the reference offset data value PO for the track stored in the ROM 18b. If the measured and reference offset data values are identical to each other, the CPU 14 stores the reference offset data value PO in the RAM 18a to use the same as the actual offset data value, whereas if they are not identical to each other, the CPU 14 uses the offset data value stored in the RAM 18a as the actual offset data value. The RAM 18a does not store the off-set data values of all the tracks on the disk 4, and hence the offset data values of tracks, which are not measured, are estimated by use of interpolation, etc.

Subsequently, when read/write access is performed by the host computer, the same positioning control as in the first embodiment is performed (see FIG. 4). Specifically, the speed control is performed in the above-described manner, thereby moving the head 50 to the target track. Then, the speed control is shifted to the track following control, and the head 50 is moved to the center of the target track. At this time, the CPU 14 detects the settling time period required to reliably position the head 50 to the center of the track. The CPU 14 causes the timer 17 to start counting after the head 50 is moved from a track located immediately before the target track, so as to detect the settling time period.

The CPU 14 compares the detected settling time T1 with a reference settling time period T2 stored in the RAM 18a. The reference settling time period 2 is a theoretical value obtained based on a reference seeking time period, and is prestored in the RAM 18a.

If the detected settling time period T1 is shorter than the reference settling time period T2, the CPU 14 sets the offset data value stored in the RAM 18a, as the actual offset data value. The CPU 14 then uses the off-set data value stored in the RAM 18a to correct offset occurring when the head 50 is positioned to the target track.

Specifically, to perform the speed control to move the head 50 to the target track, the CPU 14 reads an offset data value from the RAM 18a, and supplies the D/A converter 15 with a speed error signal. The amplifier 19a of the VCM driver 19 converts an analog voltage signal output from the D/A converter 15, to a driving current, and supplies the VCM 3 with a driving current containing a component corresponding to the read offset data value. Then, to perform the track following control so as to move the head 50 to the center of the target track, the CPU 14 reads an offset data value from the RAM 18a, and supplies the D/A converter 15 with a position control signal. The amplifier 19a of the VCM driver 19 converts an analog voltage signal output from the D/A converter 15, to a driving current, and supplies the VCM 3 with a driving current which contains a component corresponding to the off-set data value. Thus, the offset is corrected, and the head 50 is positioned to the center of the target track in the setting time period T1 (this can be done when the offset value is 0 as shown in FIG. 6A).

On the other hand, if the detected settling time period T1 exceeds the reference settling time period T2, the CPU 14 corrects the offset data value stored in the RAM 18a, by repeating the measurement of offset performed after turn-on of the system, as is described above. The CPU 14 sets in the RAM 18a the offset data value newly measured, and moves the head 50 to the target track by use of the newly set offset data value. At this time, the CPU 14 renews the offset data value, and also switches the switches 53b–53d from one to another in response to a gain correction signal, thereby changing the gain of the gain correction circuit 53. To change the gain, the CPU 14 calculates an optimal gain value on the basis of a servo signal output from the servo signal generator 51.

As is explained above, in the sector type servo system or the dedicated type servo system according to the invention, the settling time period required to move the head to a target track on the disk is obtained at the time of read/write access of the host computer. If it is Judged as a result of comparison between it and a reference value that the settling time period does not fall within an allowable range, the offset data value stored in a memory (RAM 18a) is renewed. At this time, the gain of the gain correction circuit may be changed to correct the gain of the servo system.

In the invention, the settling time period is obtained each time head seeking operation is performed. When it exceeds a reference value, it is determined that the set offset data value becomes inappropriate under temperature or voltage changed, and the offset data value is renewed to an optimal value. Thus, an optimal offset data value can be used to position the head. In other words, offset which may occur at the time of positioning the head to the center of a track can reliably be corrected, thereby shortening the settling time period.

Further, it is not necessary in the invention to employ any particular temperature and/or voltage sensors, which means that the invention is more advantageous than the prior art which employs sensors for monitoring changes in temperature and/or voltage. In addition, in the invention the offset data value is checked each time head seeking operation is performed at the time of read/write access. Therefore, the invention is more advantageous than the prior art in which the offset data value is renewed at regular intervals and hence read/write access is interrupted at regular intervals.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A storage apparatus having a servo system for performing positioning control of a head employed, comprising:
   memory means storing offset data to be used to correct offset occurring when the head is moved to a target track on a disk by use of the servo system;
   timer means for detecting a settling time period required to move the head to the center of the target track at the time of performing head positioning by the servo system;
   determination means for determining whether or not the settling time period detected by the timer means is appropriate; and
   correction means for correcting the offset data stored in the memory means when the determination means determines that the settling time period is inappropriate.

2. The apparatus according to claim 1, wherein the timer means starts to operate when the head is moved to a track located immediately before the target track, and measures the settling time period required to move the head to the center of the target track.

3. The apparatus according to claim 1, wherein the determination means has a memory storing a reference value of the settling time period, and compares the reference value stored in the memory, with the settling time period detected by the timer means, thereby determining that the detected settling time period is inappropriate if it exceeds the reference value, and determining that the detected settling time period is appropriate if it is lower than the reference value.

4. The apparatus according to claim 1, wherein the correction means obtains new offset data while the head is moved to the target track on the disk by means of the servo system, if the detected settling time period is inappropriate.

5. The apparatus according to claim 1, further comprising gain adjusting means having gain correction means for performing gain correction of the servo system, and changing the gain of the gain correction means to an appropriate value if the determination means determines that the settling time period is inappropriate.

6. A method of performing positioning control of a head by use of a servo system, comprising the steps of:
storing offset data in memory means to correct off-set which can occur when the head is moved to a target track by means of the servo system;
detecting a settling time period required to move the head to the center of the target track during head positioning control performed by the servo system;
determining whether or not the detected settling time period is appropriate; and
correcting the offset data stored in the memory means if the settling time period is inappropriate.

* * * * *

UNITED STATES PATENT AND TRADEMARK OFFICE
CERTIFICATE OF CORRECTION

PATENT NO. : 5,333,083
DATED : July 26, 1994
INVENTOR(S) : Yasumasa NAKANO

It is certified that error appears in the above-indentified patent and that said Letters Patent is hereby corrected as shown below:

On the title page;
    Attorney, Agent, or Firm,     line 1 after "Henderson" insert --,--;.

Attorney, Agent, or Firm     line 2, change "Gerrett" to --Garrett--.

Signed and Sealed this

Twenty-eight Day of February, 1995

Attest:

BRUCE LEHMAN

*Attesting Officer*      *Commissioner of Patents and Trademarks*